(12) United States Patent
Hunzinger (10) Patent No.: US 6,829,493 B1
(45) Date of Patent: Dec. 7, 2004

(54) ADAPTIVE ADJUSTMENT OF SLEEP DURATION TO INCREASE STANDBY TIME IN WIRELESS MOBILE STATIONS

(75) Inventor: Jason F. Hunzinger, Carlsbad, CA (US)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 09/557,281

(22) Filed: Apr. 24, 2000

(51) Int. Cl.$^7$ ................................................ H04B 1/38
(52) U.S. Cl. ................. 455/574; 455/127.4; 455/127.6; 455/343.2; 455/343.5; 455/311; 455/553.1; 455/522; 455/161.1; 370/311
(58) Field of Search ................. 455/57.2, 574, 455/127, 343, 553.1, 127.6, 154.2, 161.1; 370/311

(56) References Cited

U.S. PATENT DOCUMENTS

| | | | | |
|---|---|---|---|---|
| 5,355,518 A | * | 10/1994 | Kindinger et al. | 340/7.34 |
| 6,016,312 A | * | 1/2000 | Storm et al. | 340/7.34 |
| 6,453,181 B1 | * | 9/2002 | Challa et al. | 455/574 |

* cited by examiner

*Primary Examiner*—David Hudspeth
*Assistant Examiner*—David Nguyen
(74) *Attorney, Agent, or Firm*—Harness, Dickey & Pierce, PLC (57) ABSTRACT

A system for a wireless mobile station is disclosed. The system enables the mobile station to adaptively adjust sleep durations and wakeups during a low power idle mode between paging channel slots. The adjustment of sleep durations and wakeups are based on number of key-presses or other input/output (I/O) activities within a fixed number of paging channel slots. The adjustment increases standby time for the mobile station.

22 Claims, 7 Drawing Sheets

ADAPTIVE ADJUSTMENT OF SLEEP DURATION TO INCREASE STANDBY TIME IN WIRELESS MOBILE STATIONS

BACKGROUND

The present system relates to cellular telephones, and specifically to adaptive adjustment of sleep duration in such a cellular telephone.

A Code Division Multiple Access (CDMA) paging channel transmitted by a base station is divided into slots. A cellular telephone, often referred to as a mobile station, operating in the slotted mode only needs to monitor its own slot for messages and may "sleep" at other times to increase standby time.

When the cellular telephone, or "mobile station," is not engaged in a call, the mobile station does not continuously monitor the paging channel. It spends a percentage of its time in a low power state to save power. When in these low power states between paging channel slot cycles, the mobile station shuts off all non-essential circuitry. These low power idle periods conserve power and prolong battery life. However, the mobile station needs to maintain reasonably good response time for keypad presses, data cable traffic, and other input/output (I/O) signals. Therefore, the mobile station circuitry often remains active even during idle periods. This drains power from the battery.

SUMMARY

In recognition of the above, the inventor has developed a system for a wireless mobile station that enables the mobile station to adaptively adjust sleep durations and wakeups during a low power idle mode between paging channel slots. The adjustment of sleep durations and wakeup intervals are based on a number of key-presses or other input/output (I/O) activities within a fixed number of paging channel slots. The adjustment increases standby time for the mobile station.

In one aspect, the sleep duration adjustment system includes a counter, a processor, an expiration time register, a timer, and a signal generator. The processor adjusts sleep durations and wakeups based on a number of key-presses or other input/output (I/O) activities within a fixed number of paging channel slots. The counter is configured to count a number of clock cycles from a last wakeup. The counter allows adjustment of sleep durations by fixing the number of clock cycles before a next wakeup. The timer allows the mobile station to have at least two states with different sleep durations and wakeups between the paging channel slots. The expiration time register holds an expiration time for the timer. The register indicates when to transition from one state to another state of the two states. The signal generator generates a transition signal to transition the mobile station from one state to another state when a time kept by the timer reaches the expiration time stored in the expiration time register.

In another aspect, a method of increasing standby time in a wireless mobile station is disclosed. The method involves starting a timer containing a time value when an input is received. The mobile station is placed into a first state with a first sleep duration. The mobile station is then transitioned into a second state with a second sleep duration when the time value reaches a pre-specified value. The second sleep duration is longer than the first sleep duration.

In a further aspect, a wireless telephone device is disclosed. The device includes a housing, and a sleep duration adjustment system within the housing. The system adaptively adjusts sleep durations and wakeups during a low power idle mode between paging channel slots based on a number of key-presses or other input/output (I/O) activities within a fixed number of said paging channel slots. The adjustment increases standby time for the telephone device.

BRIEF DESCRIPTION OF THE DRAWINGS

Different aspects of the disclosure will be described in reference to the accompanying drawings wherein.

DETAILED DESCRIPTION

The inventor recognized that by adapting the duration of sleep periods between slotted-mode slots, a battery life could be prolonged. In some embodiments, the adaptation criteria include likelihood of requiring a response to a keypad press, data cable traffic, and other input/output (I/O) signals.

Figure 1:
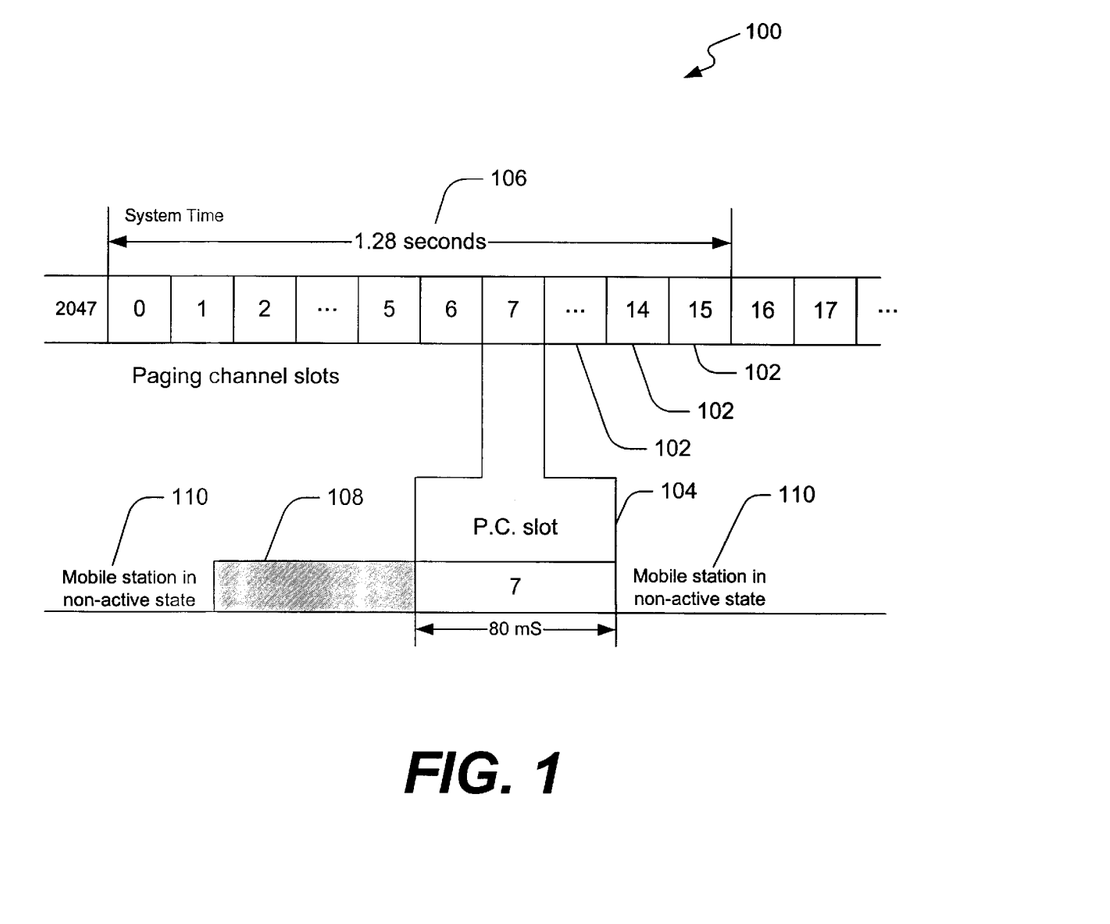
FIG. 1 shows a typical mobile station slotted mode structure.

FIG. 1 shows a typical mobile station slotted mode structure 100. The structure 100 illustrates a paging channel divided into 80 ms slots referred to as paging channel slots 102, 104.

A mobile station monitors the paging channel only during certain assigned slots 104. This is referred to as operating in the "slotted mode." In the slots 102 during which the paging channel is not being monitored, the mobile station can stop or reduce its processing for power conservation. A mobile station operating in the slotted mode generally monitors the paging channel for one or two slots per slot cycle.

In an embodiment shown in FIG. 1, the paging channel slot 7 is first monitored. The minimum length of the slot cycle 106 has 16 slots of 80 ms each, which equals 1.28 seconds. Thus, within this 1.28 second slot cycle period 106, only slot 7 (80 ms) is monitored. The next slot, in which the mobile station needs to wake up to monitor the paging channel, is 16 slots later, at slot 23.

For each of its assigned slots 104, the mobile station initiates the monitoring of the paging channel in time to receive the first bit of the assigned slot 104. Reacquisition of an RF link in the system begins at a specified time 108 before the beginning of the assigned slot (slot 7).

The mobile station in a CDMA system is synchronized with system time, which is the timing maintained by base stations and a network controller in the CDMA system. Timing for the forward link (base station to mobile station) is maintained by the mobile station. The expectation is that, when an assigned slot occurs, the mobile can wake up quickly, make corrections for timing uncertainties and be ready to acquire and process the paging channel. Once the slot period ends, the mobile station can return to its non-active state 110.

Figure 2A:
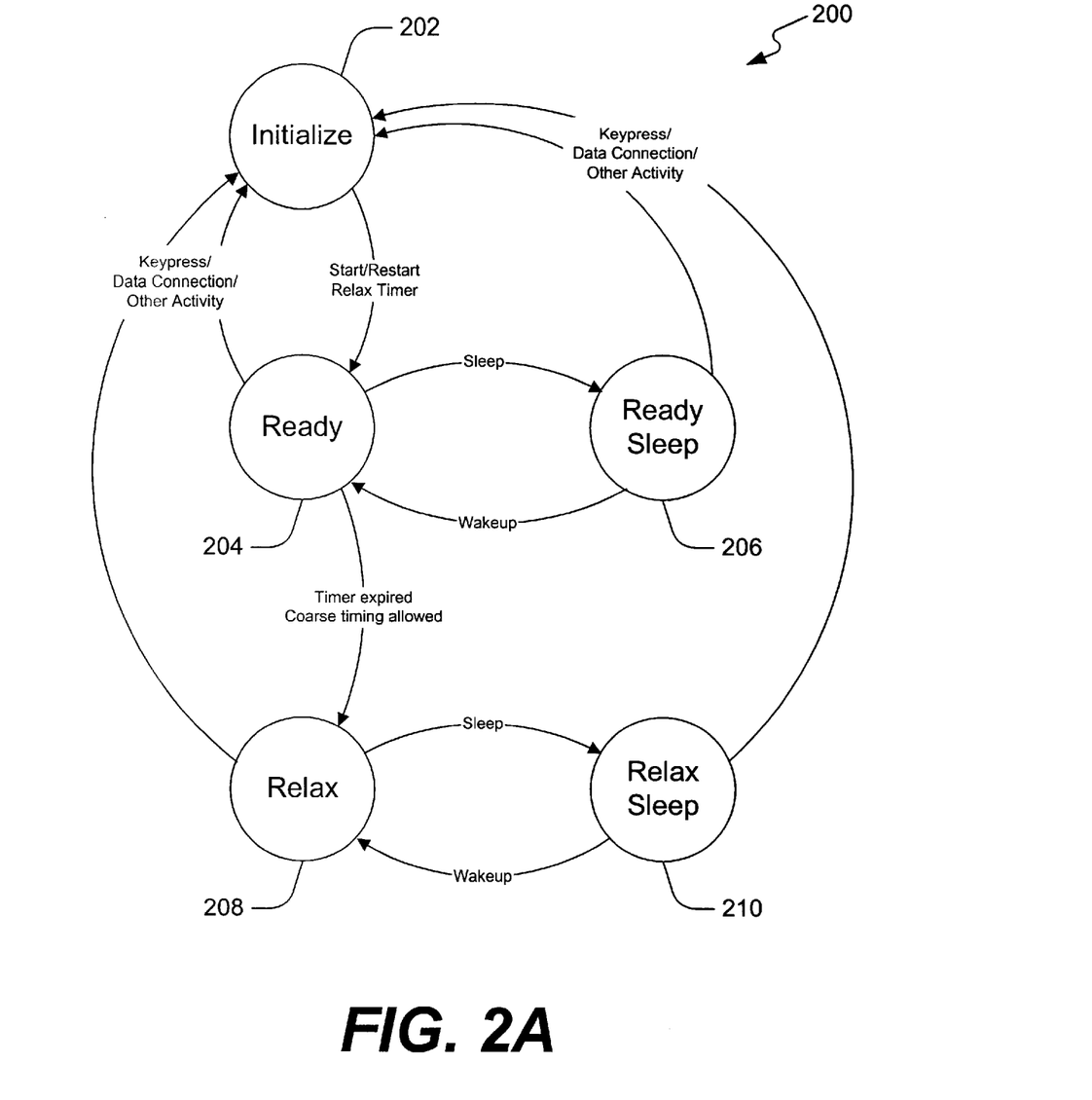
FIG. 2A is a state diagram of an adaptive process for adjustment of sleep duration between paging channel slots in accordance with one embodiment.

An adaptive process for adjustment of sleep duration between the paging channel slots depends on the likelihood that a response to user or remote input will be required. FIG. 2A illustrates this adaptive process in a state diagram. This process is substantially similar to adapting the number of wakeups between slots. For example, the mobile station can extend the duration of the sleep periods to a full slot cycle length if the user has not pressed any keys for a significant period of time and no other output or processing is required within that time frame. When the user presses a key, the mobile station can revert to a short sleep period so that it can react to an origination in a timely manner.

For the illustrated embodiment of FIG. 2A, the mobile station is in an initial state such as Initialize 202. When the mobile station receives user or remote input, the mobile station starts a timer. With the receipt of the input, the mobile station is also transitioned into a heightened state, such as Ready 204. The timer keeps incrementing until another user or remote input is received or the timer expires. The time kept by the timer indicates how long the mobile station should remain ready in the Ready state 204 for a quick response. If another input is received, the timer is restarted. During the time that the timer is running the mobile remains ready to handle a time critical operation.

Figure 2B:
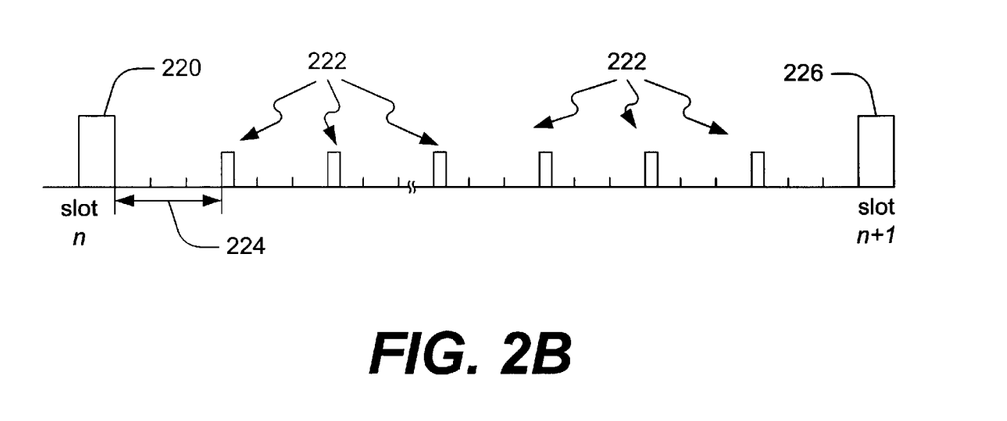
FIG. 2B is a timing diagram of a ready sleep state according to one embodiment of the present system.

Once the mobile station enters the Ready state 204, the mobile station is in a heightened state-of-ready. From the Ready state 204, the mobile station is periodically transitioned into a sleep state such as Ready Sleep 206. A timing diagram of the Ready Sleep state 206 is shown in FIG. 2B. The diagram shows relatively short sleep periods 224 with one or more intermediate wakeups 222. This sleep period is shorter than the sleep period in a relax state described below. The intermediate wakeups 222 occur between two paging channel slots n 220 and n+1 226.

When the timer expires (i.e. the timer reaches some pre-specified value), the mobile station can revert to the longer relaxed sleep period such as Relax 208. The mobile station enters the Relax state 208 if fine-tuned timing is not required.

Figure 2C:
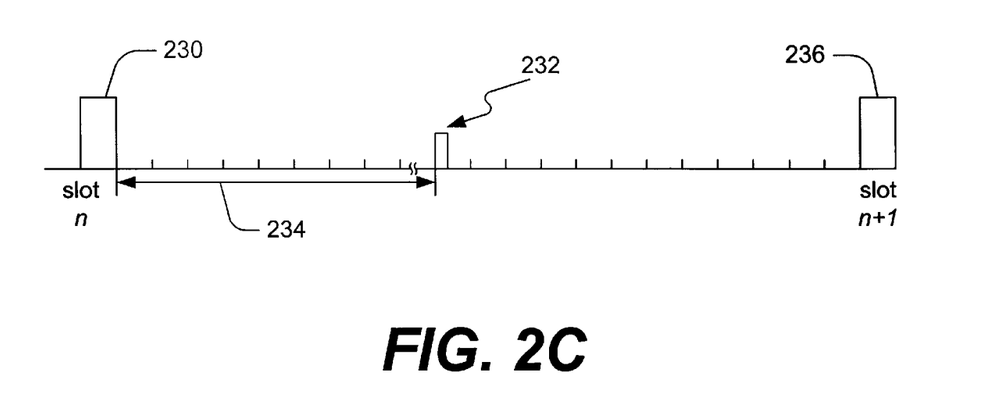
FIG. 2C is a timing diagram of a relax sleep state according to one embodiment of the present system.

In the Relax state 208 case, it is less likely that any quick response will be required in the short term. Thus, the mobile station is periodically transitioned into another sleep state such as Relax Sleep 210. A timing diagram of the Relax Sleep state 210 is shown in FIG. 2C. The diagram shows relatively long sleep periods 234 with one or more intermediate wakeups 232. The intermediate wakeups 232 occur between two paging channel slots n 230 and n+1 236. The diagram shows the sleep periods 234 of the Relax Sleep state 210 is longer than the sleep periods 224 of the Ready Sleep state 206. Therefore, by programming the pre-specified expiration time of the timer, the sleep duration between the paging channel slots can be adaptively adjusted.

Figure 3:
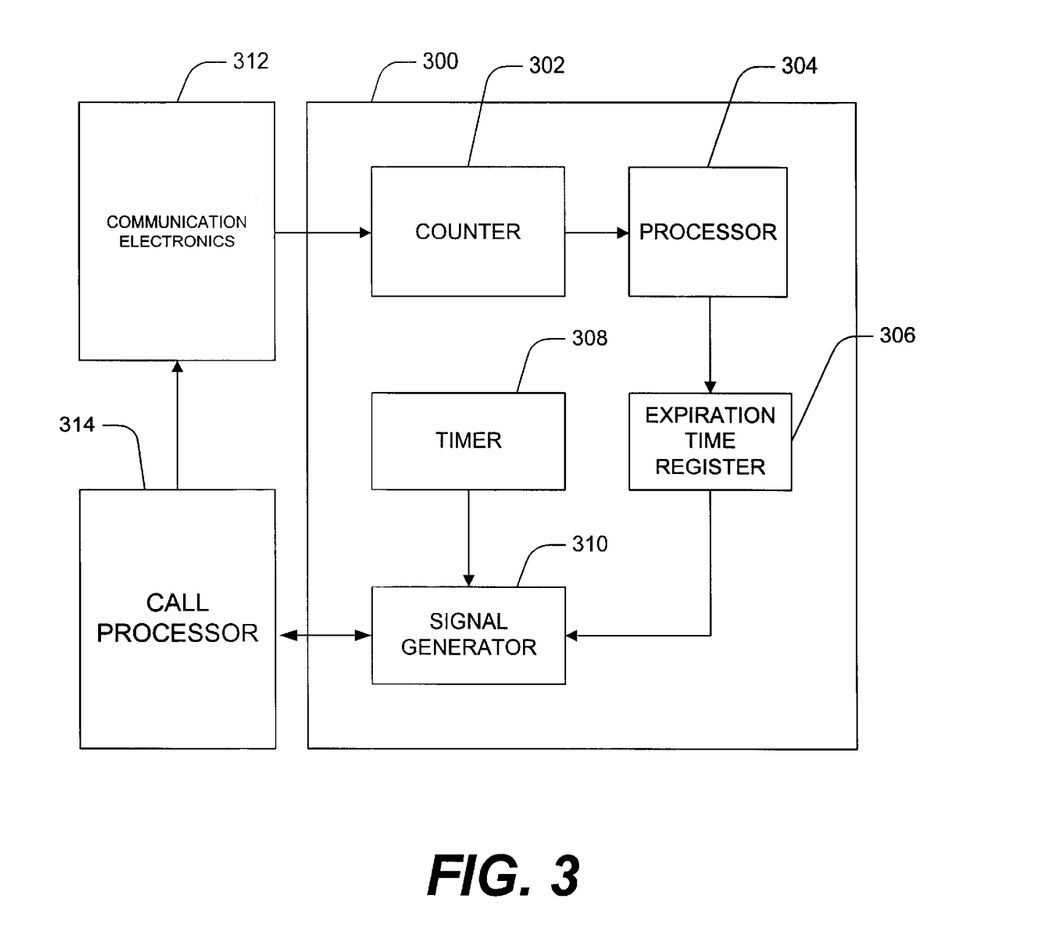
FIG. 3 is a block diagram of an adaptive inter-slot-cycle sleep duration processor according an embodiment of the present system.

FIG. 3 is a block diagram of an adaptive inter-slot-cycle sleep duration processor 300 in accordance with an embodiment of the present system. Communication electronics 312 receive and convert the communication data according to control signals from a call processor 314. The communication electronics 312 sends the signal to the sleep duration processor 300. The sleep duration processor 300 includes a counter 302, a processor 304, an expiration time register 306, a timer 308, and a signal generator 310.

The counter 302 is configured to count the number of clock cycles from the last wakeup. The last wakeup can be a paging channel slot or an intermediate wakeup. Therefore, the counter 302 determines the sleep periods within two paging channel slots. The counter 302 sends this count information to the processor 304.

The processor 304 utilizes the adaptive process described above to adjust the inter-slot-cycle sleep durations and wakeups. In the above-described embodiment of FIG. 2A, the processor 304 adjusts the sleep durations and wakeups according to the amount of time the mobile station spends in a ready state waiting for a timer to expire. Once the timer expires, the inter-slot cycle sleep duration is increased. In other embodiments, the wakeup intervals are adjusted according to some adaptive function of the number of clock cycles from the last wakeup event. For example, the adaptive function can be selected to optimize the system response to the key-presses and other I/O activities.

The expiration time register 306 contains the pre-specified expiration time for the timer 308. When the timer 308 reaches the value stored in the expiration time register 306, the signal generator generates a signal to the call processor 314 to transition the mobile station into a relax state having longer sleep periods.

Figure 4:
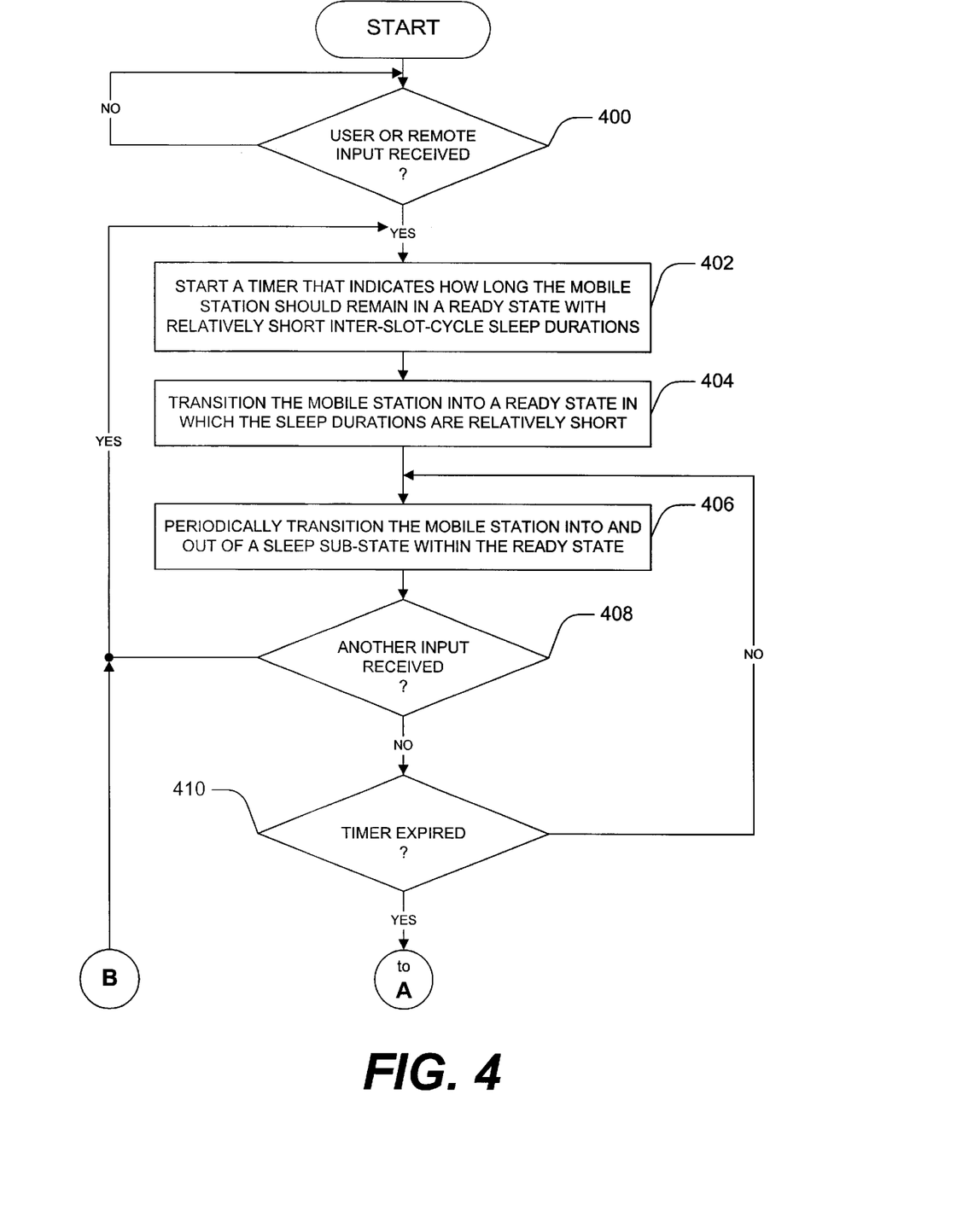
FIG. 4 is a flowchart of the adaptive process for adjustment of sleep duration according to one embodiment of the present system.

FIG. 4 is a flowchart of the adaptive process for adjustment of sleep duration according to one embodiment of the present system. The process begins in an initial state. If user or remote input is received at step 400, a timer is started at step 402. At step 404, the mobile station is transitioned into a ready state in which the inter-slot-cycle sleep durations are relatively short. Thus, the timer indicates how long the mobile station should remain in this ready state. Once the mobile station enters the ready state, the mobile station is periodically transitioned into and out of a sleep sub-state within this ready state, at step 406. Hence, there may be one or more intermediate wakeups between slot cycles n and n+1.

If another input is received at step 408, the mobile station is transitioned back to the initial state. Otherwise, the timer is checked for expiration at step 410. If the timer has expired without any more input, the mobile station is transitioned into a relax state at step 412. The sleep durations within this relax state are longer than those of the ready state. In the relax state, the mobile station is periodically transitioned into and out of a sleep sub-state at step 414. Hence, there may be no intermediate wakeups or one or more intermediate wakeups in this sleep sub-state. However, the number of intermediate wakeups are less than the number of intermediate wakeups in the ready sleep sub-state. If another input is received within the relax state (step 416), the mobile station is transitioned back to the initial state.

Figure 5:
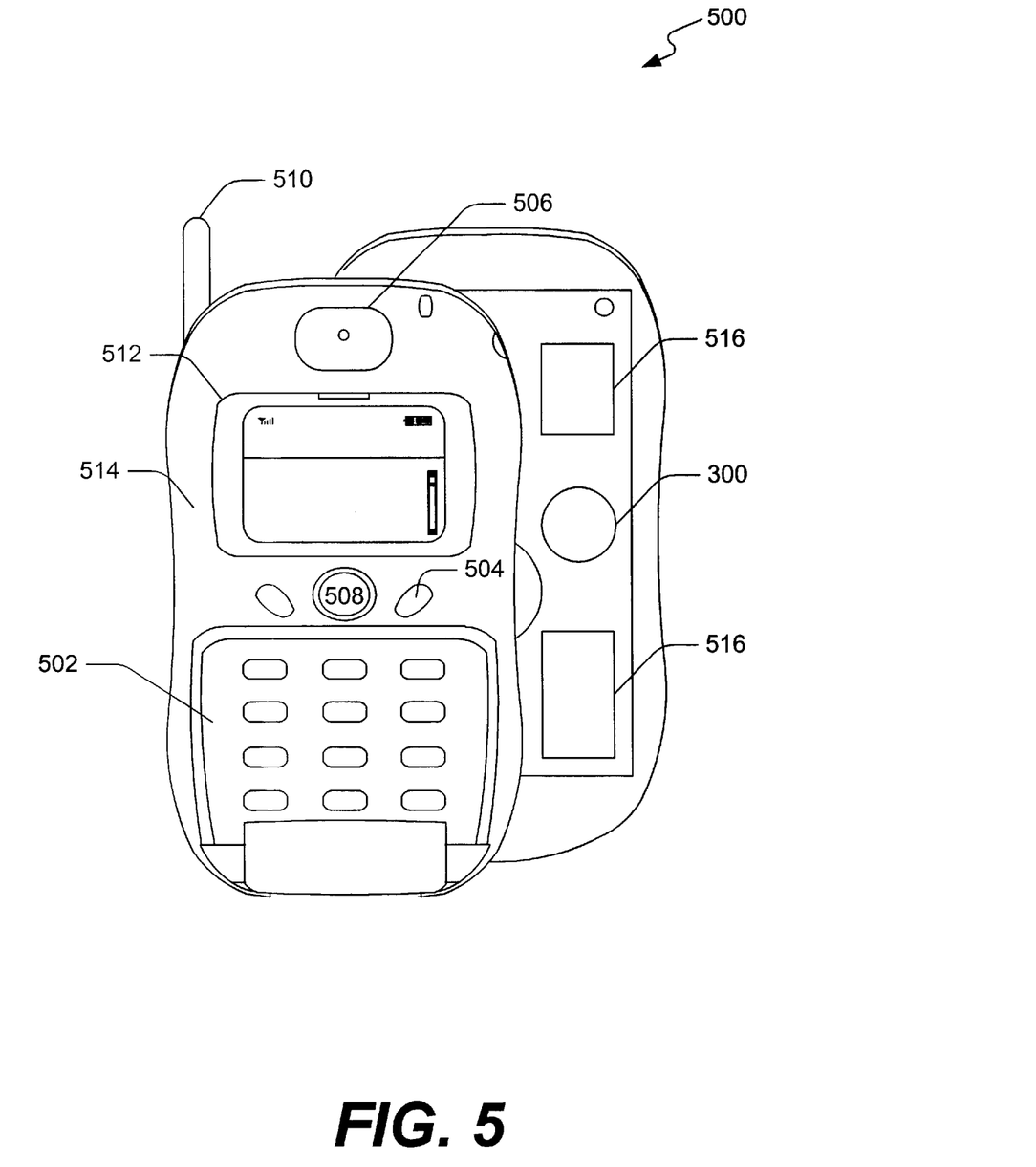
FIG. 5 shows a front view of a wireless device, such as a cellular telephone, according to one embodiment of the present system.

FIG. 5 shows a front view of a wireless device, such as a cellular telephone, according to one embodiment of the present system. The telephone 500 uses the adaptive inter-slot-cycle sleep duration processor 300 described above for adjusting inter-slot-cycle sleep durations and wakeups. The cellular telephone 500 also includes a keypad 502 and various other buttons and indicators 504. The telephone 500 also includes a speaker 506, a microphone 508, an antenna 510, and other communication electronics 516 contained within a telephone housing 514. A display unit 512 is used in conjunction with the keypad 502 to facilitate user inputs.

Above described embodiments are for illustrative purposes only. Other embodiments and variations are possible. For example, the sleep durations and intermediate wakeups during the inter-slot-cycle period can be adjusted to any amount or number with any number of states. Therefore, a mobile station can be transitioned into many more states than just the ready state or the relax state.

All these are intended to be encompassed by the following claims.

What is claimed is:

1. A method of increasing standby time in a wireless mobile station, comprising:
    operating in a first state wherein the mobile station enters a sleep state for a first number of periods between consecutive assigned slots;
    determining whether likelihood of requiring a response to an event is diminished while operating in the first state;
    transitioning to a second state when the likelihood is diminished; and
    operating in said second state wherein the mobile station enters the sleep state for a second number of periods between consecutive assigned slots, wherein said second number of periods corresponding to operating in said second state is less than said first number of periods corresponding to operating in said first state.

2. The method of claim 1, wherein the periods of said first state have a first duration and the periods of said second state have a second duration that is longer than said first duration.

3. The method of claim 2, wherein said first duration and second duration are fixed.

4. The method of claim 1, wherein said measure of likelihood is one of the group consisting of the time since a last key press, a time since a date connection, a time since input/output activity, and a number of key presses during a time period.

5. The method of claim 1, further comprising comparing said measure of likelihood to a threshold to determine whether or not to transition from said first state to said second state.

6. The method of claim 2, wherein response to an event occurs after completing any period in progress.

7. A method of increasing standby time in a wireless mobile station that operates in at least one of a first state and a second state, comprising:
    operating in said second state by entering a sleep state for a second number of periods between consecutive assigned slots;
    determining whether likelihood of requiring a response to an event is increased while operating in the second state;
    transitioning to said first state when the likelihood is increased; and
    operating in said first state by entering the sleep state for a first number of periods between consecutive assigned slots, wherein said second number of periods corresponding to operating in said second state is less than said first number of periods corresponding to operating in said first state.

8. The method of claim 7, wherein the periods of said first state have a first duration and the periods of said second state have a second duration that is longer than said first duration.

9. The method of claim 8, wherein said first duration and said second duration are fixed.

10. The method of claim 7, wherein said measure of likelihood is one of the group consisting of the time since a last key press, a time since a data connection, a time since input/output activity, and a number of key press during a time period.

11. The method of claim 7, further comprising comparing said measure of likelihood to a threshold to determine whether or not to transition from said second state to said first state.

12. The method of claim 7, wherein response to an event occurs after completing any period in progress.

13. A sleep system for a wireless mobile station, comprising:
    a circuit that enables a wireless mobile station to operate in one of a first state and a second state during low power idle operation wherein
    the wireless mobile station enters a sleep state during separate short sleep periods and wakes during an intermediate wake up period between consecutively assigned slots in the first state,
    the wireless mobile station enters the sleep state during a long sleep period between the consecutive assigned slots in the second state, the long sleep period is longer than the short sleep period,
    the circuit determines whether likelihood of requiring a response to an event is diminished, and
    the circuit controls the state of the wireless mobile station based on the likelihood so that the wireless mobile station transitions from the first state to the second state when the likelihood is diminished while operating in the first state.

14. The system of claim 13, wherein said circuit further includes a timer that provides an amount of time the mobile station has been in the first state.

15. The system of claim 14, wherein said circuit further includes an expiration time register that holds an expiration time for said timer, said expiration time indicating when to transition from the first state to the second state.

16. The system of claim 14, wherein said circuit further includes a processor operating to reset said timer based on a number of key presses or other input/output (I/O) activities within a period of time.

17. The system of claim 14, wherein duration of said sleep periods is fixed for each state and wherein a response to an event occurs after completing any sleep period in progress.

18. The method of claim 1, wherein the diminishment of the likelihood is determined by determining whether a certain time period has lapsed without receiving an input.

19. The method of claim 1, further composing:
    determining whether the likelihood is increased within the second state;
    transitioning from the second state to the first state when the likelihood is increased; and
    operating in the first state.

20. The method of claim 19, wherein the increase of the likelihood is determined by determining whether an input is received.

21. The method of claim 1, wherein the mobile station exits the sleep state for a first number of intermediate wakeups that are provided between the consecutive periods in the first state,
    the mobile station exits the sleep state for a second number of intermediate wakeups that are provided between the consecutive periods in the second state, and
    the second number of intermediate wakeups corresponding to operating in said second state is less than said first number of intermediate wakeups corresponding to operating in said first state.

22. The method of claim 9, wherein the mobile station exit the sleep state for a first number of intermediate wakeups that are provided between the consecutive periods in the first state,
    the mobile station exits the sleep state for a second number of intermediate wakeups that are provided between the consecutive periods in the second state, and
    the second number of intermediate wakeups corresponding to operating in said second state is less than said first number of intermediate wakeups corresponding to operating in said first state.

* * * * *